A. J. WAINDZIOCH.
ENGINE TESTER.
APPLICATION FILED DEC. 15, 1911.
1,051,931.
Patented Feb. 4, 1913.
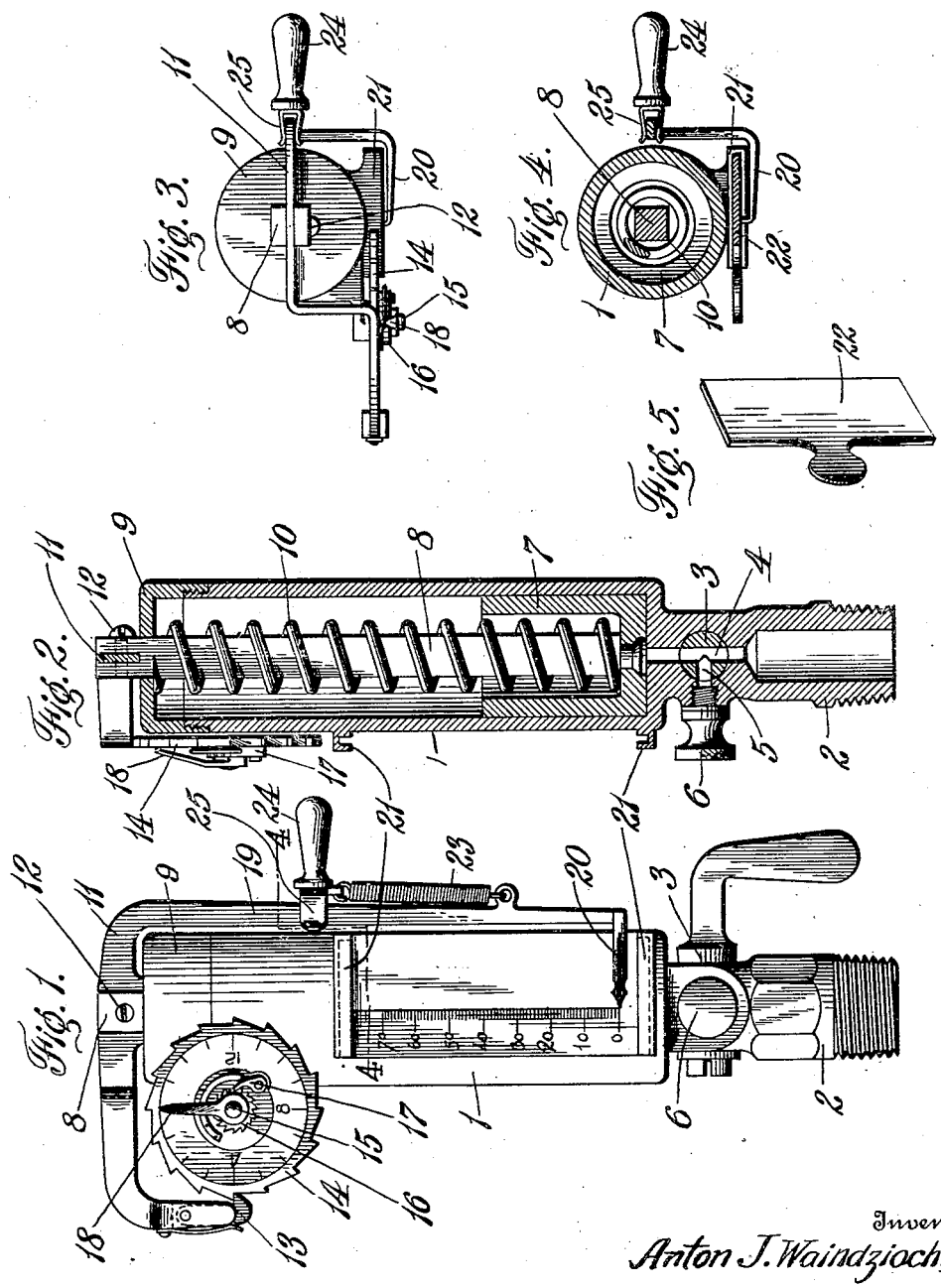
Witnesses
Chas. W. Stauffiger
Anna M. Doe
Inventor
Anton J. Waindzioch,
By
Attorneys

UNITED STATES PATENT OFFICE.

ANTON J. WAINDZIOCH, OF DETROIT, MICHIGAN.

ENGINE-TESTER.

1,051,931.  Specification of Letters Patent.  Patented Feb. 4, 1913.

Application filed December 15, 1911. Serial No. 635,966.

*To all whom it may concern:*

Be it known that I, ANTON J. WAINDZIOCH, a subject of the Emperor of Germany, residing at Detroit, in the county of Wayne and State of Michigan, have invented certain new and useful Improvements in Engine-Testers, of which the following is a specification, reference being had therein to the accompanying drawings.

This invention relates to a device for testing internal combustion engines and its object is to provide a cheap and convenient device which may be readily attached to the cylinder of an engine to indicate the compression therein and the number of strokes per minute made by the piston.

A further object is to provide means for determining whether the proper explosion is taking place in the cylinder and whether the sparking devices are operating properly.

To these ends the invention consists in the matters hereinafter set forth and more particularly pointed out in the claims, reference being had to the accompanying drawing in which, Figure 1 is a side elevation of a device embodying the invention; Fig. 2 a vertical section through the same; Fig. 3 a plan view thereof; Fig. 4 a transverse section on the line 4—4 of Fig. 1; and Fig. 5 is a perspective of an indicating tablet, detached.

A tubular body or cylinder 1 is formed with a nipple 2 at its lower end which is externally screwthreaded to engage a screwthreaded opening in the head of an engine cylinder. The nipple is bored longitudinally to form a passage from the engine cylinder into the lower end of the cylinder 1, and is bored transversely to form a seat for a plug valve 3 having a transverse opening 4 to register with the passage leading to the cylinder, and also formed with a lateral opening 5 connecting with the opening 4 to register with a lateral opening in the nipple, which opening is closed by a plug 6.

A piston 7 fits closely in the bore of the cylinder 1 and is preferably formed of metal which is softer than the metal of the cylinder, such as Babbitt metal, and a piston rod 8 which is preferably rectangular in cross section, is secured at its inner end to the piston and extends outward through a square opening in the piston head 9. A coiled spring 10 is sleeved on the piston rod between the head and piston to move the piston in one direction. A bent arm 11 is detachably attached to the outer end of the piston rod by a screw bolt 12 and carries at one end a pivoted pawl 13 to engage an indicating wheel 14 having peripheral notches and mounted to turn freely upon a stud 15 carried by the cylinder. A small ratchet wheel 16 secured to the stud is engaged by a pawl 17 carried by the wheel 14 to prevent said wheel from turning in a direction opposite to that in which it is turned by the pawl 13. A pointer 18 fixed on the stud 15 moves over graduation marks or an indicating scale on the wheel. The end 19 of the arm opposite that to which the pawl 13 is attached, is bent downward parallel with the cylinder and extended to near the lower end thereof where it is provided with a laterally extending pointer 20 running over a scale or graduated marks on the cylinder. Guides 21 are provided on the cylinder above and below the scale for the pointer 20 and a tablet 22 of slate or other suitable material is provided to engage the guides 21 which are adapted to hold it in place beneath the pointer 20 so that when the pointer moves, it will engage and mark upon the tablet which may be simultaneously moved in the guides by the operator to cause the pointer to make a zig-zag mark as it reciprocates up and down.

Pivotally attached to the arm 19 is a coiled spring 23 having at its opposite end a handle 24 formed of a suitable insulating material and provided with spring fingers 25 to embrace the arm 19 and hold the spring and handle attached thereto and in inoperative position. The operator may test the adjacent spark plug in the engine cylinder by detaching the handle from the arm 19 and bringing the spring fingers 25 into contact with the terminal or wire leading to the spark plug, the spring 23 forming an electrical connection between the fingers and the engine cylinder through the arm 19 and cylinder 1.

The operator may determine whether the cylinder is firing properly and regularly or not, by removing the plug 6 and turning the valve 3 to the position shown in Fig. 2, when the explosion in the engine cylinder will shoot through the hole 5 in the plug. In this position of the valve, the force of the explosions will pass upward into the cylinder 1 and force the piston 7 upward against the action of the spring 10 and the force of the explosions and also the compression in the engine cylinder will be indicated by the pointer 20 moving over the scale as the piston rod is moved outward to a greater or lesser extent according to the force coming upon the piston. When the engine piston is moving very rapidly, it is difficult to note the indication on the scale over which the pointer is moving, and to obviate this difficulty the tablet 22 may be slipped into the guides and the movements of the piston indicated thereon. The higher the compression in the engine cylinder, the farther the piston 7 will be moved thereby against the action of the spring 10 and the longer the marks will be on the tablet.

The speed of the motor is indicated by the turning of the wheel 14, said wheel being turned one notch upon each upstroke of the piston 7, and by timing the turning of the wheel, the number of strokes per minute made by the engine piston is readily determined.

Having thus fully described my invention what I claim is:—

1. The combination of a cylinder having indicating markings on one side and an externally screwthreaded nipple at its lower end formed with a passage therethrough leading into the end of the cylinder, a piston in said cylinder, a piston rod attached to the piston and extending outward through the end of the cylinder, a spring for moving the piston in one direction, a bent arm on the outer end of the rod, a pointer carried by one end of the arm adjacent to the indicating markings on the cylinder, a pawl carried by the opposite end of said arm, and an indicating wheel engaged and turned by said pawl.

2. The combination of a cylinder, a nipple on the lower end of the cylinder having a passage therethrough leading to the lower end of the cylinder, and a transverse opening and a hole leading laterally from the transverse opening, a plug valve in the transverse opening having passages to register with the passage and lateral hole in the nipple, a piston in the cylinder, a piston rod for the piston extending through the upper end of the cylinder, a spring within the cylinder to move the piston in one direction, a bent arm carried by the outer end of the piston rod, an indicating wheel and means on the arm for engaging and actuating the wheel.

3. The combination of a cylinder adapted to be connected at its lower end to an engine cylinder, a piston in said cylinder, a piston rod extending through the upper end of the cylinder, a spring in the cylinder engaging the piston to move the same in one direction, an arm carried by the outer end of the rod, an indicating wheel, means carried by said arm for engaging and turning said wheel, a downwardly bent end on the arm extending parallel with the cylinder and having a pointer at its lower end moving over an indicating scale on the exterior of the cylinder, a spring attached to said arm, an insulating handle on said spring, and means for detachably holding the handle in place upon the arm.

4. The combination of a cylinder, a screw-threaded nipple on the lower end of the cylinder having a passage therethrough into the cylinder, a piston in the cylinder, a piston rod which is rectangular in cross section extending through the upper end of the cylinder, a coiled spring sleeved on said rod between the end of the cylinder and the piston, a bent arm on the outer end of the rod, a pawl on one end of the arm, an indicating wheel having peripheral notches engaged by said pawl and provided with indicating marks, a fixed pointer projecting over the indicating marks, a pawl and ratchet to prevent the backward turning of the wheel, a downwardly bent end on the arm extending parallel with the cylinder, and a laterally extending pointer on the lower end of said downwardly bent end of the arm, said cylinder being provided with indicating marks on its outer surface over which said pointer is adapted to move.

In testimony whereof I affix my signature in presence of two witnesses.

ANTON J. WAINDZIOCH.

Witnesses:
LEWIS E. FLANDERS,
A. M. SHANNON.